United States Patent
Wilson et al.

(10) Patent No.: US 10,519,321 B2
(45) Date of Patent: Dec. 31, 2019

(54) PEEL-RESISTANT SELF-HEALING COATINGS AND STAINS FOR POROUS SUBSTRATES

(71) Applicant: Autonomic Materials, Inc., Champaign, IL (US)

(72) Inventors: Gerald O. Wilson, Savoy, IL (US); Byron R. Ebbert, Mansfield, IL (US)

(73) Assignee: Autonomic Materials, Inc., Champaign, IL (US)

(*) Notice: Subject to any disclaimer, the term of this patent is extended or adjusted under 35 U.S.C. 154(b) by 112 days.

(21) Appl. No.: 15/656,963

(22) Filed: Jul. 21, 2017

(65) Prior Publication Data

US 2018/0022942 A1    Jan. 25, 2018

Related U.S. Application Data

(60) Provisional application No. 62/365,162, filed on Jul. 21, 2016.

(51) Int. Cl.
| | |
|---|---|
| *B01J 13/16* | (2006.01) |
| *B01J 13/18* | (2006.01) |
| *C09D 5/00* | (2006.01) |
| *C09D 7/65* | (2018.01) |
| *C09D 7/40* | (2018.01) |
| *C08K 9/10* | (2006.01) |

(52) U.S. Cl.
CPC ............... *C09D 5/00* (2013.01); *B01J 13/16* (2013.01); *B01J 13/18* (2013.01); *C09D 7/65* (2018.01); *C09D 7/70* (2018.01); *C08K 9/10* (2013.01)

(58) Field of Classification Search
CPC .. B01J 13/16; B01J 13/18; C09D 5/00; C09D 7/65; C09D 7/70; C08K 9/10
See application file for complete search history.

(56) References Cited

U.S. PATENT DOCUMENTS

| | | | |
|---|---|---|---|
| 6,420,052 B1 | 7/2002 | Keeney et al. | |
| 7,192,993 B1* | 3/2007 | Sarangapani | .......... C09D 5/086 |
| | | | 523/200 |
| 2007/0166542 A1* | 7/2007 | Braun | .................... B29C 73/163 |
| | | | 428/402.21 |
| 2008/0152815 A1 | 6/2008 | Stephenson et al. | |
| 2011/0060074 A1* | 3/2011 | Xing | .................... C04B 20/1037 |
| | | | 523/208 |
| 2015/0111987 A1* | 4/2015 | Wilson | .................... B29C 73/22 |
| | | | 523/209 |
| 2015/0184041 A1* | 7/2015 | Ahn | ........................ C09J 163/00 |
| | | | 428/413 |
| 2017/0051156 A1* | 2/2017 | Chilukuri | .................. C23C 4/06 |
| 2017/0158886 A1* | 6/2017 | Odarczenko | .......... C09D 163/00 |

FOREIGN PATENT DOCUMENTS

WO    2015-171429    11/2015

OTHER PUBLICATIONS

Sunlight-Induced Self-Healing of a Microcapsule-Type Protective Coating by Song et al., Applied Materials and Interfaces, 2013/5/1378-84, Feb. 2013.*

* cited by examiner

*Primary Examiner* — Irina S Zemel
(74) *Attorney, Agent, or Firm* — Schwabe, Williamson & Wyatt, P.C.

(57) ABSTRACT

Disclosed are methods of protecting porous substrates and/or increasing the peel-resistance of coatings and stains for porous substrates. The methods may include providing a stain or coating comprising a microencapsulated self-healing material; and applying the stain or coating to a porous substrate. Damage to the stain or coating may release the self-healing material at a site of damage, such as a crack or scratch in the stain or coating. The self-healing material may be a polymeric precursor, an unsaturated polyester resin or alkyd, a fatty acid-based natural oil or derivative thereof, or a cross-linkable silane or siloxane monomer or resin. The microencapsulated self-healing material may include a microcapsule having a shell wall that includes a thermosetting polymer or a thermoplastic polymer; the thermosetting polymer may include urea-formaldehyde, melamine formaldehyde, polyurethane, polyurea, or polyacrylate; and the thermoplastic polymer comprises poly(methyl methacrylate), poly(lactic acid), or poly(glycolic acid).

20 Claims, 4 Drawing Sheets

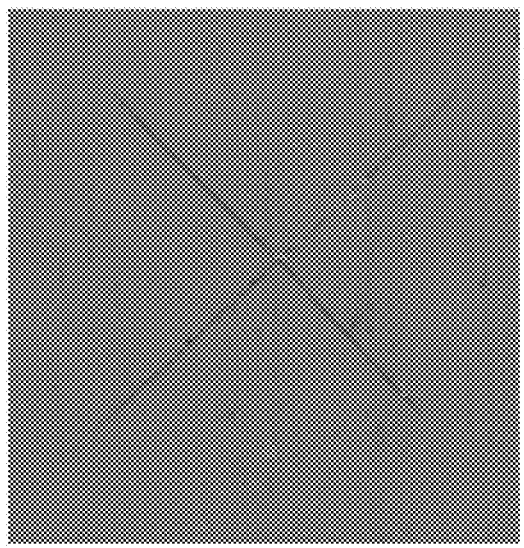
Figure 4C — 5wt% Type 1 Capsules
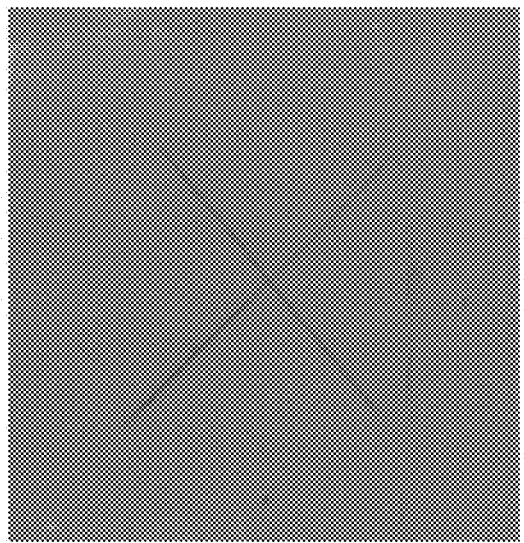
Figure 4B — 5wt% Type 2 Capsules
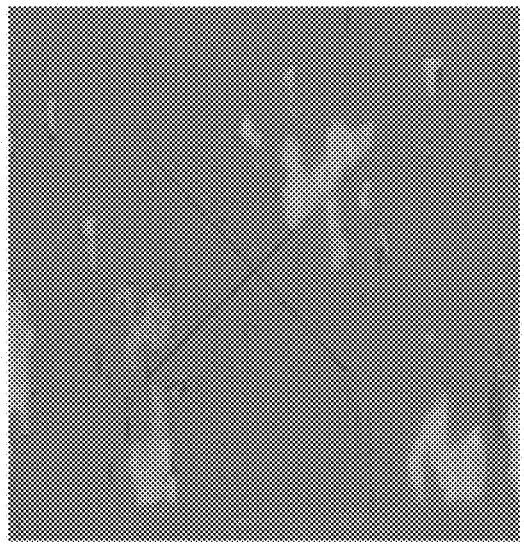
Figure 4A — Control

PEEL-RESISTANT SELF-HEALING COATINGS AND STAINS FOR POROUS SUBSTRATES

CROSS REFERENCE TO RELATED APPLICATION

The present application claims priority to U.S. Provisional Application No. 62/365,162, which was filed on Jul. 21, 2016, and titled "PEEL-RESISTANT SELF-HEALING COATINGS AND STAINS FOR POROUS SUBSTRATES," and which is hereby incorporated by reference herein.

TECHNICAL FIELD

Embodiments herein relate to self-healing materials, particularly peel-resistant coatings and stains for porous substrates.

BACKGROUND

The ability of a coating or stain to protect an underlying substrate over a period of time depends on the ability of the coating or stain to remain adhered to that substrate. Such adhesion is heavily dependent on adequate preparation of the substrate prior to application of the coating or stain. Many commercially available coatings and stains for non-metal substrates do not exhibit long-term adhesion to the substrates to which they are applied. This is particularly true for stains and coatings that are targeted at the consumer and "do it yourself" market segments, where substrate preparation often is sub-optimal. As a result, adhesive failure may occur quickly after application.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

FIGS. 4A-4C shows a comparison of various versions of a solid body stain including a control formulation containing no microcapsules (FIG. 4A) and examples containing 5 wt % of type 2 (FIG. 4B) and type 1 microcapsules (FIG. 4C) respectively, in accordance with various embodiments.

DETAILED DESCRIPTION OF EMBODIMENTS OF THE INVENTION

Figure 1:
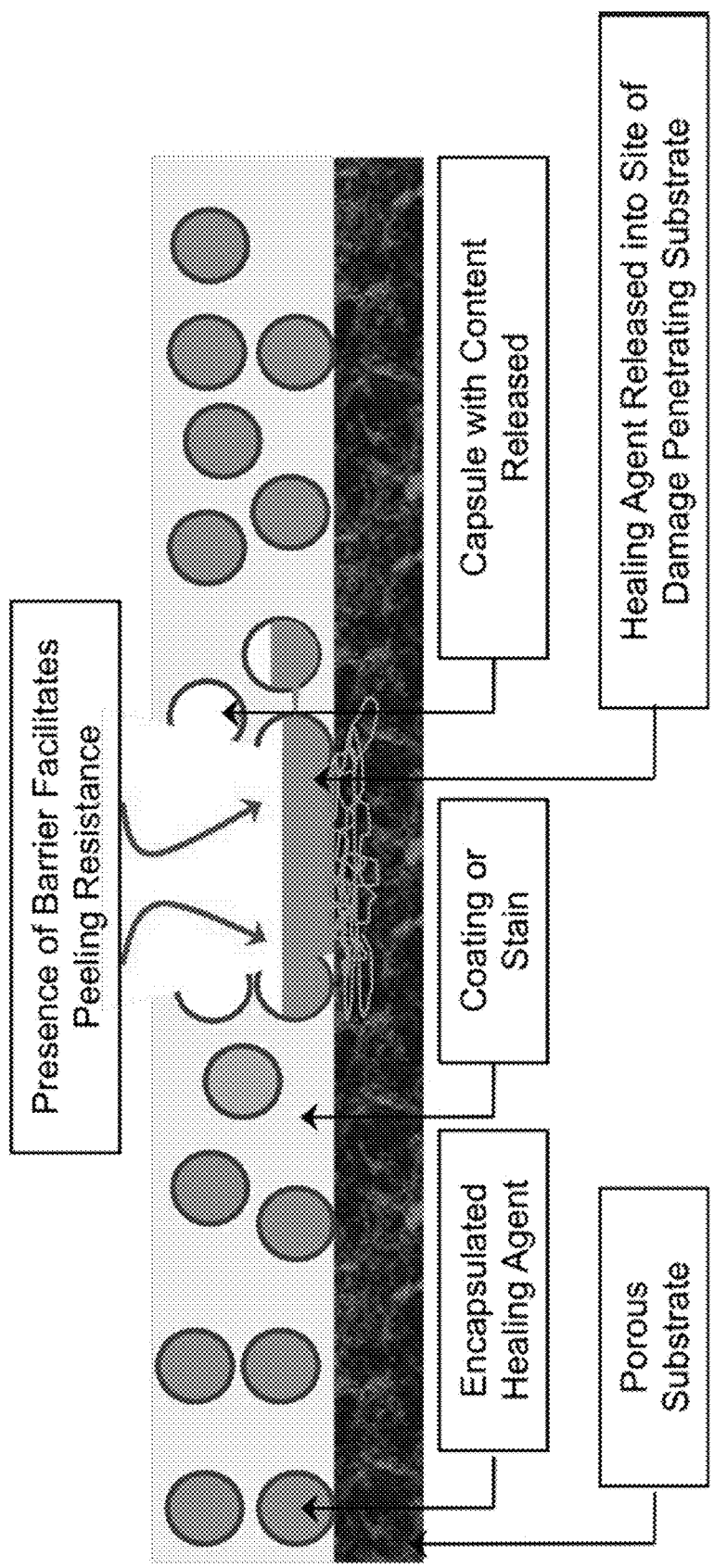
FIG. 1 is a schematic illustration showing an example of a coating or stain that contains a microencapsulated self-healing material, wherein the coating or stain is applied to a porous substrate, in accordance with various embodiments.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

Disclosed in various embodiments are microencapsulated self-healing materials and methods of using these materials in coatings and stains that may be applied to porous substrates. As used herein, the term "self-healing materials" refers to a class of smart materials that are capable of repairing themselves when they are damaged. In various embodiments, the microencapsulated self-healing materials disclosed herein may be incorporated into a stain or coating prior to application on a porous substrate. Damage to the stain or coating containing the microcapsules may rupture the microcapsules, causing the self-healing material to be released into the site of damage, where it will penetrate the pores of the substrate, polymerize, and anchor the coating or stain in the damaged area to the substrate, thereby preventing peeling. Thus, the released self-healing materials seal the perimeter of the damage, preventing further moisture ingress and the resulting loss of adhesion. In various embodiments, the disclosed microencapsulated materials may be incorporated into a coating or stain and applied to non-metal (e.g., porous) substrates to facilitate maintenance of the coating or stain's adhesion after it has been damaged.

Prior to the present disclosure, cracks typically would form in a stain or coating due to environmental factors, such as thermal cycling, humidity changes, or damage via use-related forces. Once formed, these cracks become a route of entry through which moisture may penetrate, thereby compromising the stain or coating's adhesion to the substrate. On porous substrates such as wood and concrete, such loss of adhesion may result in visible and significant peeling of the coating or stain from the substrate and compromise of the underlying substrate.

Conventional manufacturers of coating and stain formulations for porous substrates typically focus on improving adhesion on suspect surfaces, rather than the healing of damage once it has occurred. For example, conventional technologies focus on better-designed reactants (monomers and resins) and additives (rheology modifiers, surfactants, corrosion inhibitors etc.) instead of self-healing technologies. Other prior art approaches utilize a "biphasic" motif in which a thermoplastic material is compartmentalized within a thermosetting material such that, upon application of heat, flow of the thermoplastic material levels out fine scratches in the material. Unlike the formulations disclosed herein, this approach does not utilize microencapsulated self-healing materials, and the approach is specific to polyurethane-based coatings. Still other prior art approaches involve the design of transparent coatings with self-healing properties, but these formulations are not intended to be used on porous substrates such as wood and concrete.

Self-healing technologies have been developed for metal substrates, such as those described in U.S. Pat. Nos. 9,296,895 and 9,279,043, both of which are hereby incorporated by reference in their entireties. With reference to the use of unsaturated polyester chemistries as healing agents, prior to the present disclosure, these technologies were designed for use on metal substrates, and not for improvement of the coating's resistance to peeling from a porous substrate. Unlike a metal substrate, porous substrates may absorb a self-healing material that is released at the site of damage, which may result in the removal of the self-healing material from the site of damage. Thus, one of skill in the art would have expected such formulations to be ineffective on porous substrates, as less self-healing material would be available at the site of damage for maintenance of adhesion to the substrate and protection of the substrate.

Unexpectedly, as disclosed herein, the present inventors have found that, counterintuitively, absorption of the self-healing material into the substrate facilitates improved anchoring of the coating to the substrate, thereby improving the ability of the coating to maintain its adhesion after damage. Thus, the resulting peel-resistance provided by the presently claimed formulations is surprisingly effective when used on porous substrates, such as wood, concrete and other non-metal substrates.

Thus, in various embodiments, the present disclosure uses microcapsules containing polymer precursors (e.g., self-healing materials), and these microcapsules may be incorporated into a coating or stain that is then applied to a porous substrate, such as wood or concrete. FIG. 1 is a schematic illustration showing an example of a coating or stain that contains a microencapsulated self-healing material, wherein the coating or stain is applied to a porous substrate, in accordance with various embodiments. As illustrated in FIG. 1, damage to the coating or stain ruptures the microcapsules, releasing the self-healing material into the site of damage, where it penetrates the substrate prior to curing. Upon curing, the self-healing material anchors the coating or stain to the substrate.

For example, when such a coating or stain is damaged either by mechanical factors such as scratches and impact associated with its use, or environmental factors (such as thermal cycling) that institute stress into the coating or stain leading to embrittlement, the embedded microcapsules are ruptured, releasing the self-healing material into the site of damage. Once released at the site of damage, the self-healing material penetrates the pores of the porous substrate, followed by polymerization or cross-linking. In various embodiments, due to the penetration of the pores in the substrate, the resulting cross-linked self-healing material may be anchored within the pores, thereby promoting adhesion of the coating or stain to the substrate.

Figure 2:
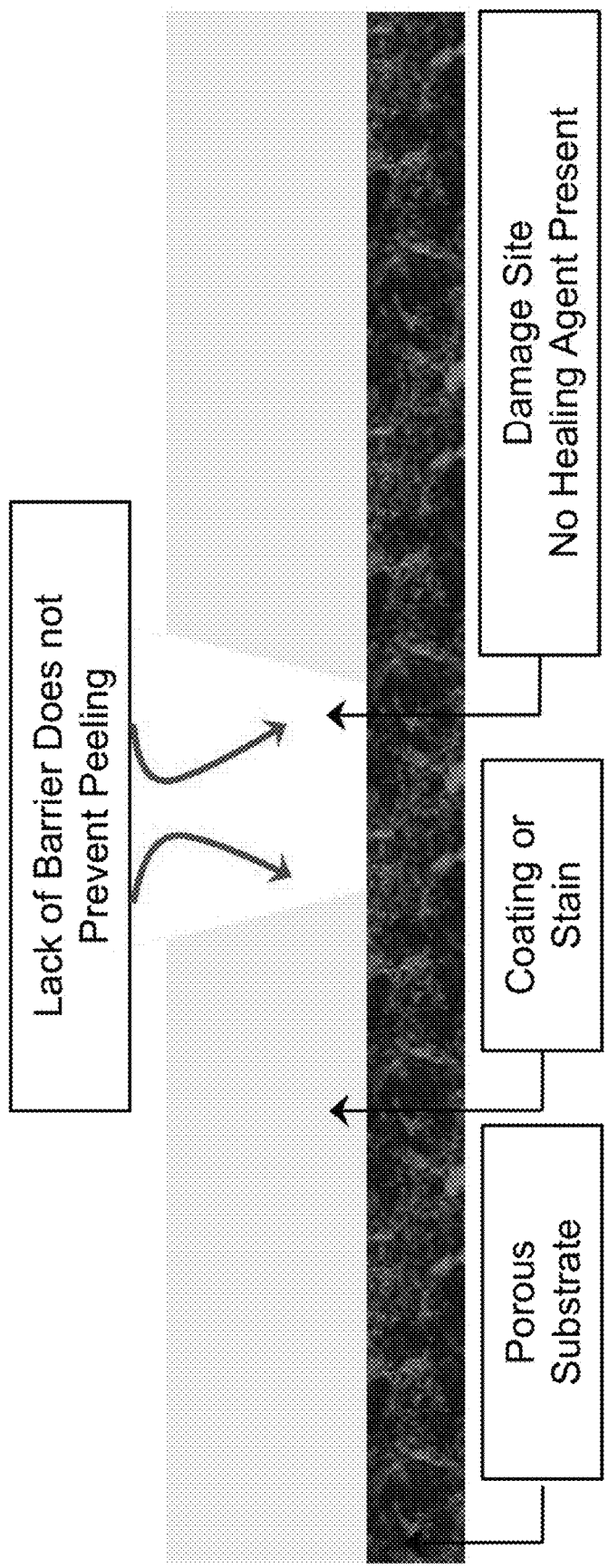
FIG. 2 is a schematic illustration showing a conventional coating or stain, wherein damage results in an entry point for moisture and other environmental stimuli and reactants, which leads to peeling, in accordance with various embodiments.

FIG. 2 is a schematic illustration showing a conventional coating or stain, wherein damage results in an entry point for moisture and other environmental stimuli and reactants, which leads to peeling, in accordance with various embodiments. As illustrated in FIG. 2, standard coatings or stains without self-healing functionality exhibit no healing at the site of damage when damage occurs, and as such have no way of maintaining the coating or stain's adhesion after it has been damaged.

In various embodiments, the self-healing materials for use in various formulations and methods disclosed herein may include any polymeric precursors that form polymers with good adhesion to porous substrates, such as wood and concrete, including but not limited to unsaturated polyester resins or alkyds, fatty acid-based natural oils and their derivatives, cross-linkable silanes and siloxane monomers and resins. In various embodiments, microcapsule shell walls may be formed from any of various thermosetting polymers, including but not limited to urea-formaldehyde, melamine formaldehyde, polyurethane, polyurea and polyacrylate prepared via in-situ or interfacial encapsulation methods. In various embodiments, the shell walls may also be formed from thermoplastic polymers, including but not limited to poly(methyl methacrylate), poly(lactic acid), poly(glycolic acid).

EXAMPLES

Example 1: Preparation and Microencapsulation of Self-Healing Material

A liquid self-healing material was prepared by blending an alkyd resin (60 wt %), ethyl phenyl acetate (EPA, 2.5 wt %) and hexyl acetate (37.5 wt %). The resulting blend formed the core phase for the encapsulation procedure. An emulsion was prepared by adding 50 mL of a 5 wt % solution of poly (ethylene-co-maleic anhydride) (MW=400 Da) in water to a 1000 mL beaker containing 200 mL of water. The beaker was situated in a water bath set at 25° C. Urea (5 g), ammonium chloride (0.5 g), and resorcinol (0.5 g) were added while stirring. The pH of the mixture was then adjusted to 3.5. The core phase (60 mL) was then added, the stirrer was adjusted to 1000 RPM, and a homogenizer was set at 13000 RPM. After stirring for about 15 minutes, formaldehyde (12.77 g) was added. The temperature of the water bath was increased to 55° C. at a rate of 1° C./minute. The reaction was then allowed to proceed for a total of 4 hours, after which it was allowed to cool to room temperature.

The resulting capsules exhibited an average size of 5 microns. The microcapsules were separated from the water phase by filtration. The resulting "filter cake" or "wet cake" contained roughly 50 wt % water, and this final form was added to water-borne formulations, while for solvent-borne formulations, the capsules were isolated from the slurry by spray-drying to yield a free flowing powder with a moisture content of less than 5 wt %. For the purpose of this disclosure, the microcapsules resulting from the encapsulation of this formulation are referred to as type 1 microcapsules, while a similar formulation in which EPA replaces the hexyl acetate is referred to as type 2 microcapsules.

Example 2: Preparation and Application of Coating or Stain Formulation

To incorporate 5 wt % of the capsules prepared above into a water-borne wood stain, 10 wt % of the wet cake was added to a standard commercially available semi-transparent or solid-body stain. The capsules were mixed in using a mechanical stirrer at between 1000 RPM and 2000 RPM. The resulting stain was then applied to southern yellow pine wood samples by brush, although, application by rag, roller, and spray gun was confirmed to be effective as well.

Example 3: Assessment of Adhesion Maintenance

Wood samples coated as described in Example 2 above were "x-scribed" using a razor blade and left at room temperature for 24 hours. The panels were then covered with cotton rags saturated with deionized water for 4 hours, after which the rags were removed and the samples were placed into a freezer for 16 hours. The samples were then taken out of the freezer and placed on the bench top at room temperature to thaw and dry for 4 hours. This series of steps was repeated for a total of 10 times, after which the adhesion of the coating around the scribed areas was assessed by applying tape over the scribes and rapidly pulling off the tape by a free end parallel to the surface.

Figure 3C:
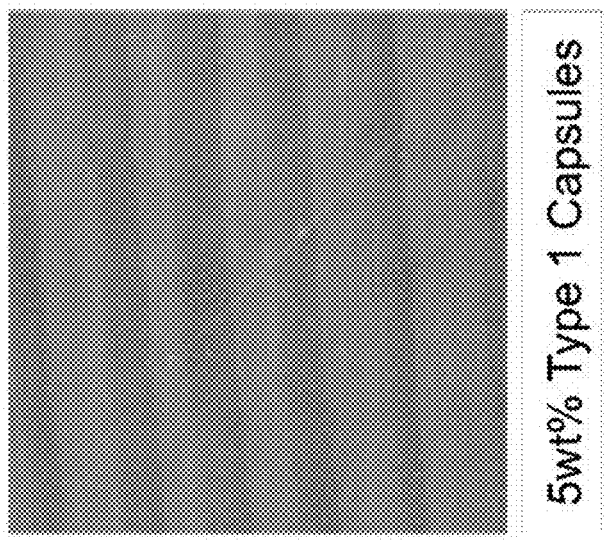
FIGS. 3A-3C show a comparison of various versions of a semi-transparent stain, including a control formulation containing no microcapsules (FIG. 3A), and examples containing 5 weight percent (wt %) of type 2 (FIG. 3B) and type 1 microcapsules (FIG. 3C) respectively, in accordance with various embodiments.
Figure 3B:
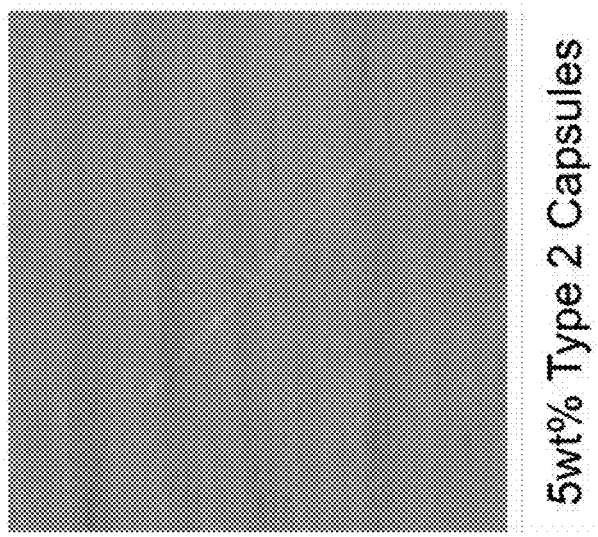
Figure 3A:
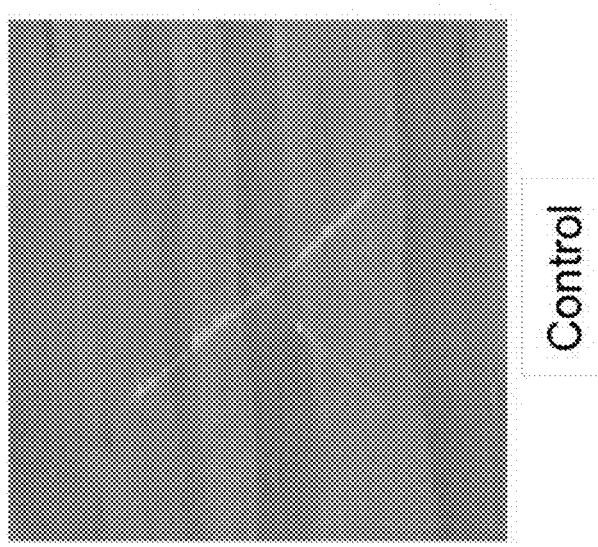

The results are documented in the images shown in FIGS. 3A-3C and 4A-4C. FIGS. 3A-3C show a comparison of various versions of a semi-transparent stain, including a control formulation containing no microcapsules (FIG. 3A), and examples containing 5 weight percent (wt %) of type 2 (FIG. 3B) and type 1 microcapsules (FIG. 3C) respectively, in accordance with various embodiments. FIGS. 4A-4C shows a comparison of various versions of a solid body stain including a control formulation containing no microcapsules (FIG. 4A) and examples containing 5 wt % of type 2 (FIG. 4B) and type 1 microcapsules (FIG. 4C) respectively, in accordance with various embodiments.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. A method of protecting a porous wood substrate, comprising:
   applying a stain or coating to a porous wood substrate, the stain or coating comprising: microcapsules that include a self-healing alkyd resin material configured to be absorbed by the porous wood substrate and adhere the stain or coating to the porous wood substrate when released from the microcapsules.

2. The method of claim 1, wherein damage to the stain or coating releases the self-healing material at a site of damage.

3. The method of claim 2, wherein the site of damage comprises a mechanical failure in the stain or coating.

4. The method of claim 2, wherein the site of damage comprises a scratch or crack in the stain or coating.

5. The method of claim 1, further comprising:
   providing a self-healing alkyd resin material; and
   microencapsulating the self-healing alkyd resin material, thereby creating the microcapsules that include the self-healing alkyd resin material.

6. The method of claim 1, wherein the self-healing alkyd resin material is a polymeric precursor.

7. The method of claim 1, wherein the microcapsules have a shell wall that comprises a thermosetting polymer or a thermoplastic polymer.

8. The method of claim 7, wherein the thermosetting polymer comprises urea-formaldehyde, melamine formaldehyde, polyurethane, polyurea, or polyacrylate.

9. The method of claim 7, wherein the microcapsules are prepared via an in-situ or interfacial encapsulation method.

10. The method of claim 7, wherein the thermoplastic polymer comprises poly(methyl methacrylate), poly(lactic acid), or poly(glycolic acid).

11. A method of increasing peel-resistance of a stain or coating, comprising:
    applying a stain or coating to a porous wood substrate, the stain or coating comprising: microcapsules that include a self-healing material configured to be absorbed by the porous wood substrate and adhere the stain or coating to the porous wood substrate when released from the microcapsules.

12. The method of claim 11, wherein damage to the stain or coating releases the self-healing alkyd resin material at a site of damage.

13. The method of claim 12, wherein the site of damage comprises a mechanical failure in the stain or coating.

14. The method of claim 12, wherein the site of damage comprises a scratch or crack in the stain or coating.

15. The method of claim 11, further comprising:
    providing the self-healing alkyd resin material; and
    microencapsulating the self-healing alkyd resin material, thereby creating the microcapsules that include the self-healing alkyd resin material.

16. The method of claim 11, wherein the self-healing alkyd resin material is a polymeric precursor.

17. The method of claim 11, wherein the microcapsules have a shell wall, that comprises a thermosetting polymer or a thermoplastic polymer.

18. The method of claim 17, wherein the thermosetting polymer comprises urea-formaldehyde, melamine formaldehyde, polyurethane, polyurea, or polyacrylate.

19. The method of claim 17, wherein the microcapsules are prepared via an in-situ or interfacial encapsulation method.

20. The method of claim 17, wherein the thermoplastic polymer comprises poly(methyl methacrylate), poly(lactic acid), or poly(glycolic acid).

* * * * *